(12) United States Patent
Hedayat et al.

(10) Patent No.: US 8,050,622 B2
(45) Date of Patent: Nov. 1, 2011

(54) METHOD AND SYSTEM FOR DETECTING MESSAGES USING ENHANCED DISTRIBUTED SIGNALING

(75) Inventors: Ahmadreza Hedayat, Allen, TX (US); Hang Jin, Plano, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 452 days.

(21) Appl. No.: 11/633,169

(22) Filed: Dec. 4, 2006

(65) Prior Publication Data
US 2007/0190932 A1 Aug. 16, 2007

Related U.S. Application Data

(60) Provisional application No. 60/772,597, filed on Feb. 10, 2006.

(51) Int. Cl.
*H04B 3/36* (2006.01)
*H04B 7/14* (2006.01)

(52) U.S. Cl. ............................................. 455/16; 455/7
(58) Field of Classification Search .................. 370/338; 455/41.2, 67.11, 67.14, 433, 7, 433.7, 16
See application file for complete search history.

(56) References Cited

U.S. PATENT DOCUMENTS

| 5,212,806 | A | 5/1993 | Natarajan | 455/33.2 |
|---|---|---|---|---|
| 6,005,884 | A | 12/1999 | Cook et al. | 375/202 |
| 6,138,261 | A | 10/2000 | Wilcoxson et al. | |
| 6,701,482 | B2 * | 3/2004 | Salvi et al. | 714/786 |
| 6,934,317 | B1 * | 8/2005 | Dent | 375/140 |
| 7,102,549 | B1 * | 9/2006 | Keirn et al. | 341/63 |
| 2005/0113084 | A1 * | 5/2005 | Scaglione et al. | 455/426.2 |
| 2005/0265387 | A1 * | 12/2005 | Khojastepour et al. | 370/467 |

OTHER PUBLICATIONS

Sendonaris et al., "User Cooperation Diversity, Part I: System Description", Nov. 11, 2003, IEEE Transactions on Communications, vol. 51, No. 11, pp. 1927, 1929.*
Kwasinki et al., "Cooperative Multimedia Communications: Joint Source Coding and Collaboration", Dec. 2005, in Proc. IEEE Global Telecommunications Conference, 2005, GLOBECOM 05, vol. 1, p. 375.*
Nosratinia et al., Cooperative Communication in Wireless Networks, Oct. 10, 2004, IEEE Communications Magazine, vol. 42, No. 10, p. 76.*
Ahlswede at al., "Network Information Flow", Jul. 2000, IEEE Transaction on Information Theory, vol. 46, No. 4, pp. 1204-1216.*
Xiong et al., "Distributed Source Coding for Sensor Networks", Sep. 2004, IEEE Signal Processing Magazine, vol. 21, Issue 5, pp. 80-94.*
Gastpar, Michael., "On the Capacity of Large Gaussian Relay Networks", Mar. 2005, IEEE Transaction on Information Theory, vol. 51, No. 3, pp. 765-779.*
Kramer et al., "Cooperative Strategies and Capacity Theorems for Relay Networks", Sep. 2005, IEEE Transactions on Information Theory, vol. 51, No. 9, pp. 3037-3063.*
Lanemen et al., "Distributed Space-Time-Coded Protocols for Exploiting Cooperative Diversity in Wireless Networks", Oct. 2003, vol. 49, No. 10, pp. 2415-2425.*
Kramer et al., "On the White Gaussian Multi-Access Relay Channel", Jun. 2000, ISIT 200, p. 40.*

(Continued)

*Primary Examiner* — Jinsong Hu
*Assistant Examiner* — Opiribo Georgewill

(57) ABSTRACT

A method and system are provided for detecting messages using enhanced distributed signaling in a wireless communication network that offers transmission diversity to improve the throughput of participating wireless stations.

10 Claims, 4 Drawing Sheets

OTHER PUBLICATIONS

Kramer et al., "Hierarchical sensor networks: Capacity bounds and cooperative strategies using multiple-access relay channel model", Oct. 2004, In Proc, 1st Annu. IEEE Communications Society Conf. Sensor Ad Hoc Communications and Networks, pp. 191-199.*

Li et al., "Slepian-Wolf cooperative: A practical and efficient compress and forward relay scheme", Nov. 2005, in Allerton Conference on Communications.*

Hunter, Todd Edward, "Coded Cooperation: A new framework for user cooperation in wireless networks" 2004, Dissertation, University of Texas at Dallas.*

Sadek et al., "Performance analysis for multi-node decode and forward relaying in collaborative wireless networks", Mar. 2005, In Proc. IEEE Int. Conf. Acoust. Speech, Signal Process (ICASSP), pp. 521-524.*

Valenti et al., "Distributed Turbo Codes: Towards the Capacity of the Relay Channel", Oct. 2003, In Proc. IEEE Veh. Technol. Cong. (VTC), pp. 322-326.*

International Preliminary Report on Patentability dated Aug. 12, 2008 cited in PCT/US2006/049108.

* cited by examiner

METHOD AND SYSTEM FOR DETECTING MESSAGES USING ENHANCED DISTRIBUTED SIGNALING

CROSS REFERENCE

The present application claims the benefit of U.S. Provisional Application Ser. 60/772,597, which was filed on Feb. 10, 2006.

BACKGROUND

A method and system are provided for detecting messages using enhanced distributed signaling for a wireless communication network. The method describes a framework in which a set of participating wireless stations work cooperatively to improve the efficiency and reliability of the wireless communication network. It is understood that the wireless stations may include both mobile terminals and fixed terminals such as base stations.

In a wireless communication network, the radio signal received by a wireless station is a noisy copy of the original signal sent by the transmitting wireless station. The natural environmental parameters, such as weather and vegetation, and man-made environmental parameters, such as buildings, impair the integrity of the radio signals. In other words, the received signal is an impaired copy of the original signal. The impairment of the radio signal reduces the data rate of the wireless network or renders the signal unrecognizable by the wireless receiver.

Low data rate at the edges of a cell in a wireless network and the existence of blind spots are widespread problems in almost all deployments of fixed or mobile wireless networks, regardless of the communication standards. Specifically, these problems are mostly due to the propagation impairment of the radio such as path loss, geographical obstacles, and deleterious effects of a radio environment.

Multiple-antenna transmission and the reception method is one of the methods that improve the reliability of the wireless communication network in hostile wireless environments through the adoption of spatial diversity. Spatial diversity primarily enhances the throughput at cell edges. Unfortunately, in some wireless applications, such as ad hoc and sensor networks, it is not feasible to deploy multiple antennas due to the size, cost, and power limitations.

The statistically independent channel condition that the wireless stations experience is a valuable source of spatial diversity. By incorporating spatial diversity, a wireless communication network that adopts the enhanced distributed signaling method creates a virtual multiple-antenna wireless transmission system with multiple single antenna wireless stations.

For a single-antenna wireless station with limited computational resources, the wireless communication network with enhanced distributed signaling offers transmission diversity that improves the throughput of the participating wireless stations. For a set of wireless stations, each of which has various levels of resource constraints, the enhanced distributed signaling method improves the performance of the wireless network with or without synchronization among all the single-antenna wireless stations.

In the wireless network with the enhanced distributed signaling method, each of the participating single antenna wireless stations act as a proxy for its peers. When a source wireless station sends a message to a destination wireless station, the radio signal that carries the message is sent to all participating wireless stations. Each participating wireless station in turn sends a supplementary signal on behalf of the source wireless station to the destination wireless station. The destination wireless station then processes the multiple noisy copies of the original signal to retrieve the original message.

The enhanced distributed signal method disclosed herein a framework for the wireless communication network with a distributed signaling method. The disclosed framework builds on the conventional distributed signal method that improves the overall system performance.

One example of a conventional distributed signal wireless communication network is a two-phase detect-and-forward system. In the conventional two-phase detect-and-forward system, a wireless station receives $\tilde{U}_i$, a noisy copy of the original signal $U_i$ from its participating peer i in the first phase. In the second phase, the participating wireless station sends its own signal, together with the noisy signal $\tilde{U}_i$ detected in the first phase, to the destination wireless station. In other words, the proxy wireless station re-transmits the noisy signal received from its peer to the destination wireless station without further processing.

One exemplary scenario of a three-node system with the detect-and-forward method, where wireless stations 1 and 2 participating in the distributed signaling method sends messages to wireless station 3, is described below.

In the first phase, wireless station 1 transmits signal $U_1$ and wireless station 2 transmits signal $U_2$. Wireless station 1 receives signal $\tilde{U}_2$, wireless station 2 receives signal $\tilde{U}_1$, and wireless station 3 receives $(\ddot{U}_1, \ddot{U}_2)$.

In the second phase, wireless station 1 re-transmits $\tilde{U}_2$, wireless station 2 re-transmits $\tilde{U}_1$, and wireless station 3 receives $$(\ddot{\tilde{U}}_1, \ddot{\tilde{U}}_2).$$

After receiving $(\ddot{U}_1, \ddot{U}_2)$ and $$(\ddot{\tilde{U}}_1, \ddot{\tilde{U}}_2),$$

wireless station 3 processes $$(\ddot{U}_1, \ddot{\tilde{U}}_1) \text{ and } (\ddot{U}_2, \ddot{\tilde{U}}_2)$$

jointly and retrieves the original messages sent by wireless station 1 and 2. If $\tilde{U}_2$ is sent, then it is amplify-and-forward.

The disclosed invention discloses a framework that is applicable to all types of wireless communication networks. One example is a centralized wireless communication network where some users might be out of reach of the base station, particularly in uplink transmission. If any wireless station experiences low throughput due to geographical obstacles or random fluctuations of the wireless channel, the disclosed signaling method brings higher throughput to all the participating wireless stations.

Another example is a wireless communication network where the wireless stations have limited transmit power, such as wireless handset or handheld devices. In this case, the wireless handset or handheld device, under the supervision of the base station can participate in the enhanced distributed signaling method described above and improves the throughput and reliability of all the participating wireless handheld devices.

The conventional distributed signaling method is based on a single-user coding method. The enhanced distributed signaling method disclosed herein introduces the concept of joint coding and signaling design for a set of network nodes in a wireless communication network. Under the framework of cooperative transmission of signals, each of the wireless stations participating in the enhanced distributed signaling method works as a single wireless transmission station and the destination wireless station decodes the received signals jointly.

The disclosed enhanced distributed signaling method not only incorporates the conventional coding methods but also supports for example, concatenated coding and cross layer schemes in physical and medium access layers.

SUMMARY

Disclosed herein are a method and system for detecting messages using enhanced distributed signaling in a wireless communication network that offers transmission diversity to improve the throughput of the participating wireless stations. The enhanced distributed signaling method improves the performance of the wireless network among all the single-antenna wireless stations. Specifically, the enhanced distributed signaling method disclosed herein provides a flexible framework that allows the wireless network designer to take into account the capabilities of the wireless stations and propagation impairment of the radio signals to select the most suitable channel coding algorithm.

In one embodiment, a method is disclosed for detecting messages using distributed signaling in a wireless communication network when messages are transmitted from at least one source wireless station to at least one destination wireless station through one or more participating wireless stations. The method comprises receiving a copy of a first predetermined message from the source wireless station, receiving a copy of a second predetermined message from the participating wireless station, receiving a first supplementary message from at least one participating wireless station based on a received copy of the first predetermined message by the participating wireless station and the second predetermined message generated by the participating wireless station, receiving a second supplementary message from the source wireless station based on the first predetermined message generated by the source wireless station and a received copy of the second predetermined message, and detecting the first predetermined message based on the copy of the first predetermined message, the copy of the second predetermined message, and the first and second supplementary messages.

The construction and method of the system and method, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the system and method described herein.

DESCRIPTION

The following detailed description refers to the accompanying drawings. The description includes exemplary embodiments, not excluding other embodiments, and changes may be made to the embodiments.

Disclosed herein are a method and system for the enhanced distributed signaling wireless network. The enhanced distributed signaling method comprises of a two-phase transmission process to improve the performance of the wireless network. Although the method described herein is for the two-phase transmission process, it can be easily extended to a method with the multiple-phase transmission process.

Figure 1:
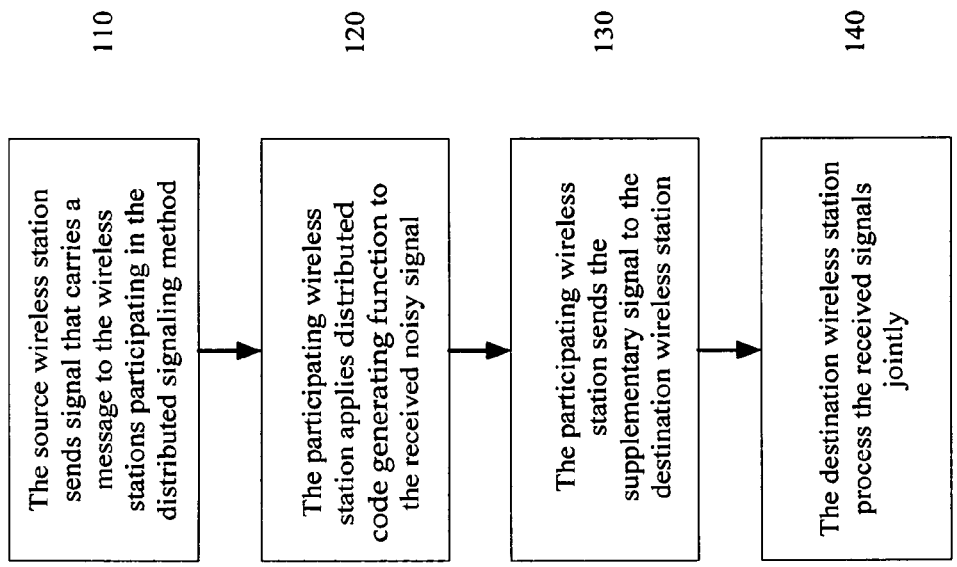
FIG. 1 shows a flow diagram of the operation of a distributed signaling method.

FIG. 1 is a flow diagram illustrating the method for the two-phase enhanced distributed signaling process. In step 110, a source wireless station sends a signal that carries the original message to some or all of its peers that participate in the enhanced distributed signaling method.

In step 120, each participating wireless station in the enhanced distributed signaling wireless network employs a predetermined distributed code generating function to process the noisy signal received from the source wireless station and generates a supplementary signal on behalf of the source wireless station. The supplementary signal carries the regenerated codeword from the distributed code generating function.

The design of the predetermined distributed code generating function is determined by the performance requirement of the wireless communication network. In one embodiment of the distributed code generating function, the designer can decide to employ a concatenated coding method to improve the performance of the wireless network.

In step 130, all the participating wireless stations send supplementary signals to the destination wireless station on behalf of the source wireless station. The rule which governs how the supplementary signals are sent in the second phase is determined by the MAC protocol of the wireless communication standard.

In step 140, the destination wireless station processes some or all the received supplementary signals jointly, according to the predetermined joint-decoding function. It is important to note that the destination wireless station can start the decoding process before receiving all supplementary signals from the participating wireless stations.

Based on the design of the predetermined joint-decoding function, the destination wireless station decides whether it has received enough copies of the supplementary signals to correctly retrieve the original message sent by the source wireless station. One approach is that the destination wireless station stops the decoding process regardless of the number of supplementary signals it has received, when the decoded message does not have any errors, indicated through the cyclic redundancy check (CRC) decoder.

Factors, such as timing requirements and available computational resources of the participating wireless stations, also affect the decoding decision made by the destination wireless station. In general, the more copies of supplementary signals received by-the destination wireless station, the higher the probability of correctly retrieving the message sent by the source wireless station.

Figure 2:
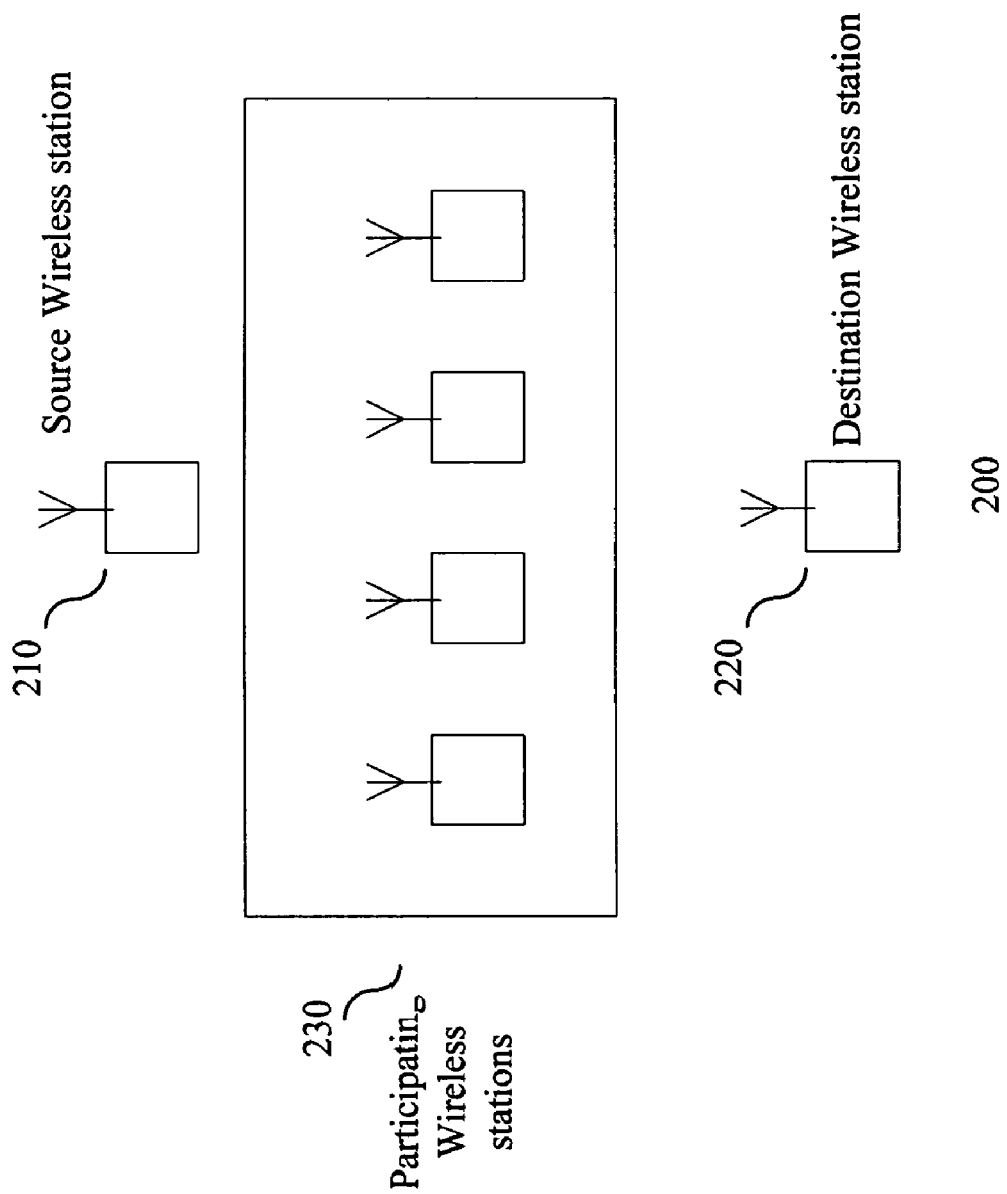
FIG. 2 illustrates a wireless communication network using a distributed signaling method.

FIG. 2 illustrates a network 200 employing the two-phase enhanced distributed signaling method. The diagram includes source wireless station 210, destination wireless station 220 and participating wireless stations in block 230. The operation flow follows the description of diagram 100.

Assume the source wireless station 210 intends to send a message to destination wireless station 220. In step 110, source wireless station 210 sends a signal that carries the original message, which is denoted as a signal vector U. Every participating node in block 230 in the enhanced distributed signaling system receives a signal vector $\tilde{U}$, which is a noisy copy of original signal vector U. The noise is injected by the radio channel. The process described above applies to every participating wireless station in block 230 in the first phase.

The noisy signal vector $\tilde{U}$ received by each of the participating wireless station differs from each other because the channel condition for each participating wireless station and the source wireless station are different.

To further differentiate the noisy copy of original signal, which is sent by wireless station i, received by every participating wireless station in block 230 from the noisy copy received by destination wireless station 220. Let $\tilde{U}$ denote the noisy copy received by every participating wireless station in block 230 and $\ddot{U}$ denote the noisy copy received by destination wireless station 220.

After the end of the first phase, each of the participating wireless stations j receives a vector of a set of signals $(\tilde{U}_1, \ldots, \tilde{U}_{j-1}, \tilde{U}_{j+1}, \ldots, \tilde{U}_n)$ from its peers. The destination wireless station receives a vector of a set of signals $(\ddot{U}_1, \ddot{U}_{k-1}, \ddot{U}_{k+1}, \ldots, \ddot{U}_n)$.

In step 120, each participating wireless station j applies the distributed code generating function $f_j$ to the vector of the set of signals $(\tilde{U}_1, \tilde{U}_{j-1}, \tilde{U}_{j+1}, \ldots, \tilde{U}_n)$ and generates the supplementary vector of the set of signals, $f_j(\tilde{U}_1, \ldots, \tilde{U}_{j-1}, U_j, \tilde{U}_{j+1}, \ldots, \tilde{U}_n)$.

In step 130, every participating wireless station in block 230 then sends $\theta_j(\tilde{U}_1, \ldots, \tilde{U}_{j-1}, U_j, \tilde{U}_{j+1}, \ldots, \tilde{U}_n)$ to the destination wireless station 220 according to the MAC access rule.

Depending on the number of wireless stations participating in the enhanced distributed signaling and the tradeoff between the reliability and throughput, there might be additional steps similar to steps 120 and 130 where the participating wireless stations send similar supplementary vectors as in step 120 and 130 but with different functions $\theta_j$, i.e., there would possibly be different sets of functions $f_j$ whenever steps 120 and 130 are repeated.

After the second phase, the destination wireless station 220 has a noisy copy of the original signal from every one of the participating wireless stations in block 230, denoted as a vector of the set of signals $(\ddot{U}_1, \ldots, \ddot{U}_{k-1}, \ddot{U}_k, \ddot{U}_{k+1}, \ldots, \ddot{U}$
$f_1(U_1, \ldots, \tilde{U}_{k-1}, \tilde{U}_k, \tilde{U}_{k+1}, \ldots, \tilde{U}_n), \ldots,$
$f_{k-1}(\tilde{U}_1, \ldots, \tilde{U}_{k-1}, \tilde{U}_k, \ldots, \tilde{U}_n),$
$f_k(\tilde{U}_1, \ldots, \tilde{U}_{k-1}, U_k, \ldots, \tilde{U}_n),$
$f_{k+1}(\tilde{U}_1, \ldots, \tilde{U}_k, U_{k+1}, \ldots, \tilde{U}_n), \ldots,$
$f_n(\tilde{U}_1, \ldots, \tilde{U}_{k-1}, \tilde{U}_k, \tilde{U}_{k+1}, \ldots, U_n))$ In step 140, the destination wireless station 220 then processes the received signals jointly to retrieve the original message of the source wireless station.

The process that aggregates codewords received from multiple wireless stations seems complex, but in reality, having a stronger aggregated codeword enables the enhanced distributed signaling wireless communication network to reduce the overall cost for achieving the same level of performance as that of a wireless system without using the enhanced distributed signaling method.

Figure 3:
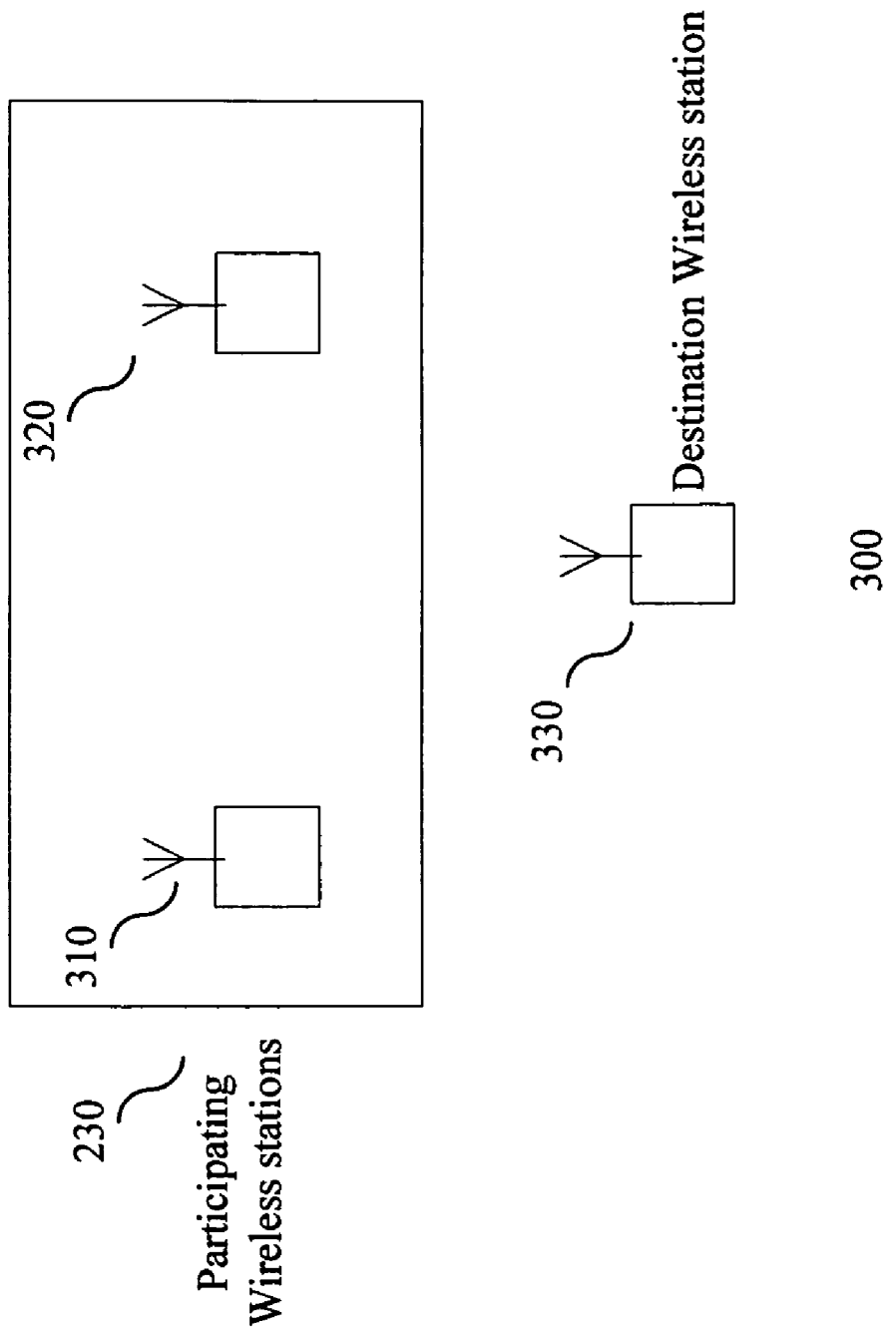
FIG. 3 illustrates one embodiment of a wireless communication network with two wireless stations participating in the enhanced distributed signaling method.

FIG. 3 illustrates a network 300 according to another embodiment. In this embodiment, the destination station does not participate in the enhanced distributed signaling method. There are three wireless stations in this example. Wireless stations 310 and 320 are the participating wireless stations in the system employing the enhanced distributed signaling method and wireless station 330, for example a base station, is the destination wireless station. The operation flow follows the description of diagram 100.

In step 110, both wireless stations 310 and 320 broadcast a signal carrying an original message to each other according to the network multiple access rules. The signal sent from wireless station 310 is denoted as vector $U_1$ and the signal sent from wireless station 320 is denoted as vector $U_2$.

Each of the participating wireless stations receives an impaired signal from each other. The signal received by wireless station 310 is denoted as $\hat{U}_2$ and the signal vector received by wireless station 320 is denoted as $\hat{U}_1$. The destination wireless station 330 receives the impaired signals sent by wireless station 310 and wireless station 320, denoted as a vector of signals $(\ddot{U}_1, \ddot{U}_2)$.

In step 120, wireless stations 310 and 320 generate the supplementary signal vector $f(U_1, \tilde{U}_2)$ and $g(\tilde{U}_1, U_2)$ with the distributed code generating function $f(\ldots)$ and $g(\ldots)$ correspondingly.

In step 130, both wireless stations transmit the supplementary signals to the destination wireless station 330. The signals sent from wireless station 310 are denoted as a vector of signal $f(U_1, \tilde{U}_2)$ and the signal sent from wireless station 320 is denoted as a vector of signal $g(\tilde{U}_1, U_2)$.

After the transmission in the second phase, destination wireless station 330 has a vector of a set of noisy signals, $(\ddot{U}_1, \ddot{U}_2, \tilde{f}(U_1, \tilde{U}_2), \tilde{g}(\tilde{U}_1, U_2))$. The destination wireless station processes all the signals $(\ddot{U}_1, \ddot{U}_2, \tilde{f}(U_1, \tilde{U}_2), \tilde{g}(\tilde{U}_1, U_2))$ jointly to retrieve the original messages sent by wireless stations 310 and 320, respectively.

Figure 4:
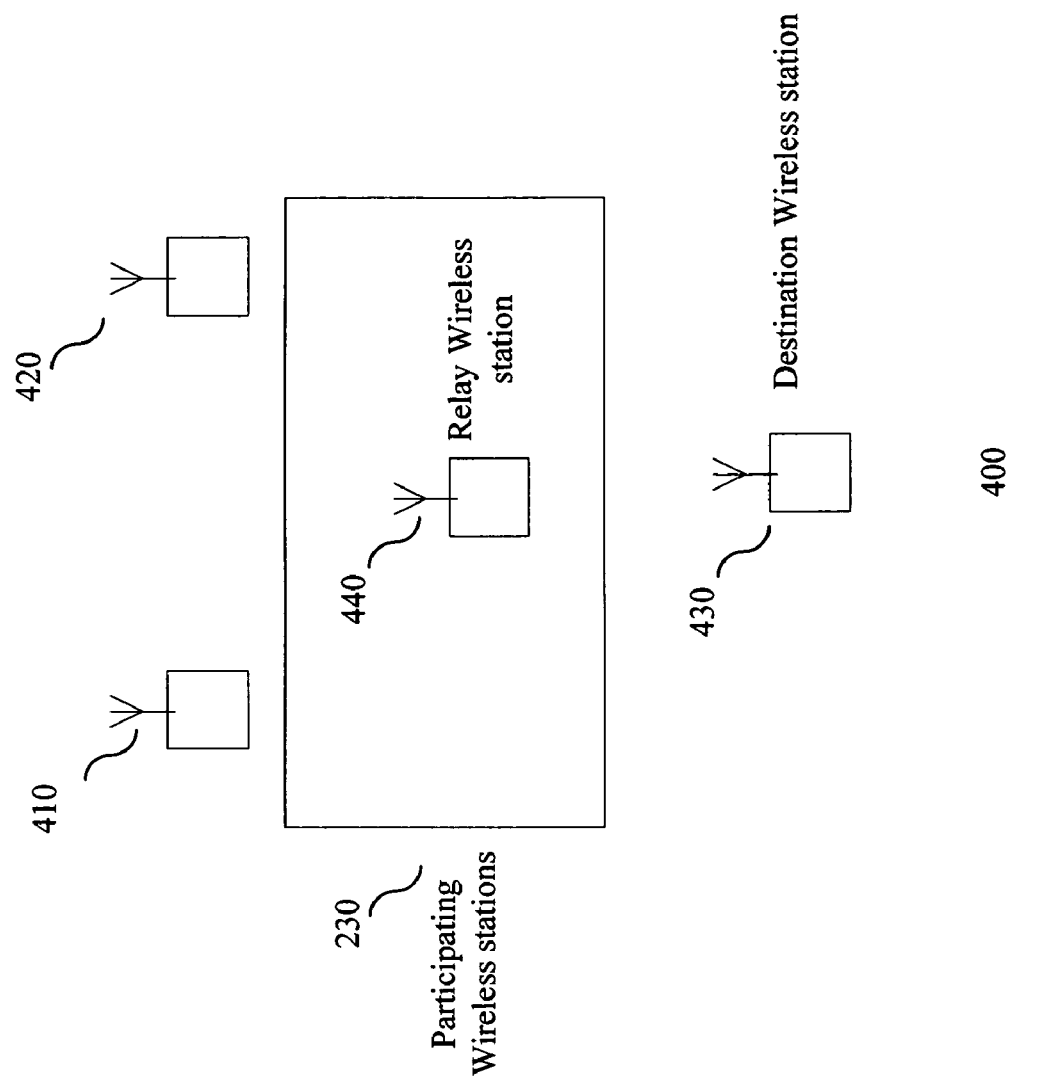
FIG. 4 illustrates one embodiment of a wireless communication network with the enhanced distributed signaling method with relaying function.

FIG. 4 illustrates a network 400 according to another exemplary embodiment where a participating wireless station relays signals for other wireless stations. In this case, the relay wireless station might be a fixed wireless station or a mobile wireless station in its idle time. Wireless stations 410 and 420 send signals carrying messages to destination wireless station 430. Wireless station 440 is the relay wireless station.

In step 110, wireless station 410 and 420 send signals, $U_1$ and $U_2$ correspondingly. Upon receiving the vector of signals $(\tilde{U}_1, \tilde{U}_2)$ from the two wireless stations, the relay wireless station constructs $f(\tilde{U}_1, \tilde{U}_2)$ in step 120, and transmits $f(\tilde{U}_1, \tilde{U}_2)$ to destination wireless station 430 in step 130.

The destination wireless station has a vector of noisy signals $(\ddot{U}_1, \ddot{U}_2, \tilde{f}(\tilde{U}_1, \tilde{U}_2))$ and will retrieve the original message by decoding the received signals $U_1$ and $U_2$ jointly in step 140.

In the enhanced distributed signaling wireless communication network, all participating wireless stations must have the same predetermined distributed code generating function $f(.,.)$ and $g(.,.)$. The design goal of the distributed code generating function $f(.,.)$ and $g(.,.)$ is to determine a suitable channel coding algorithm that generates the most effective aggregated codeword.

One of the embodiments of the distributed code generating function $f(.,.)$ is an identity function, as described in the decode-and-forward mechanism, wherein $f(U_1, \tilde{U}_2)=\tilde{U}_2$ and $g(\tilde{U}_1, U_2)=\tilde{U}_1$ Another embodiment of the distributed code generating function $f(.,.)$ is that it can do a simple binary-add (exclusive-or) operation of their arguments, wherein $f_j(\tilde{U}_1, \ldots, \tilde{U}_{j-1}, U_j, \tilde{U}_{j+1}, \ldots, \tilde{U}_n)=(\tilde{U}_1+ \ldots +\tilde{U}_{j-1}+U_j+\tilde{U}_{j+1}+ \ldots +\tilde{U}_n)$ Yet another embodiment of the distributed code generating function $f(.,.)$ is a distributed turbo code with interleavers.

In the most general case, the distributed code generating function $f(.,.)$ can perform arbitrary parity-check operations on the received vector of signals. As an example, consider a low-density parity-check (LDPC) code, where the input uncoded bits are partitioned into two sub-sets. Each of these subsets could be $U_1$ and $U_2$, and $f_1(.,.)$ and $f_2(.,.)$ are the parity-check operations that are applied to $U_1$ and $U_2$ respectively.

One advantage of the disclosed invention is that the destination wireless station processes the vector of signals of large codeword lengths, which is potentially more powerful than shorter code. The two-phase transmission of larger codeword length seems to consume more bandwidth, but in fact, the improvement of the channel code rate as a result of diversifying the signals reduces the consumption of wireless bandwidth and yet still achieves the same level of performance as other networks do.

Another advantage of the disclosed invention is the inclusion of the concatenated coding method in the enhanced distributed signaling system. A system with each participating wireless station implementing the predetermined interleaver can interleave the detected noisy data $\hat{U}$ before further processing. The destination wireless station, which observes a concatenated codeword can take advantage of iterative decoding principles to achieve further improvement on coding gain.

The distributed signaling method disclosed in this invention provides a general framework for the design of an enhanced distributed signaling system. The flexibility of the framework allows the wireless network designer to take into account the capabilities of the wireless stations and propagation impairment of the radio signals to select the most suitable channel coding algorithm to accomplish the best performance.

In one of the embodiments of the enhanced distributed signaling system, the space-time signaling can be used if the participating wireless stations are capable of synchronizing with each other and are able to transmit supplementary signals simultaneously in the second phase. In absence of synchronization, they transmit supplementary signals separately according to the network's multiple access rules.

In yet another embodiment of the enhanced distributed signaling system, the error-detection code is employed to detect the decoded message in an error-prone environment. When propagation impairment destroys the integrity, the enhanced distributed signaling system can incorporate a more powerful error recovering mechanism to recover original messages.

As illustrated above by various embodiments, the present invention provides an enhanced distributed signaling method and system for improving the performance of the wireless network. In the process, a source wireless station sends a signal that carries the original message to some or all of its peers that participate in the enhanced distributed signaling network. Each participating wireless station in the enhanced distributed signaling wireless network employs a predetermined distributed code generating function to process the signal received from the source wireless station and generates a supplementary signal. One or more of the participating wireless stations send their supplementary signals to the destination wireless station on behalf of the source wireless station. The destination wireless station processes some or all the received supplementary signals.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A wireless communication network comprising:
    a source wireless station configured to generate and transmit a message;
    a plurality of participating wireless stations configured to:
        receive the message;
        receive copies of the message from other participating wireless stations to form a corresponding vector set of signals;
        generate a supplemental message from the corresponding vector set of signals using a distributed code generating function that produces a regenerated codeword;
        transmit the supplemental message;
        generate multiple supplemental messages each with a different distributed code generating function from the corresponding vector set of signals;
        transmit the multiple supplemental signals; and
    a destination wireless station configured to:
        receive the message;
        receive copies of the supplemental message from the plurality of participating wireless stations to form a vector set of signals;
        receive the multiple supplemental messages from the plurality of participating wireless stations;
        process the vector set of signals, copies of the supplemental message, and the multiple supplemental messages according to a joint-decoding function to recover the message.

2. The network of claim 1, wherein the plurality of participating wireless stations employ a concatenated coding method for generating the regenerated codeword.

3. The network of claim 1, wherein the plurality of participating wireless stations employ a Low Density Parity-Check coding method for generating the regenerated codeword.

4. A method comprising:
    receiving at each of a plurality of participating wireless devices a copy of an original message transmitted by a source wireless device to a destination wireless device;
    at each participating wireless device, receiving signals based on the copy of the original message from other participating wireless devices to form a corresponding vector set of signals, generating a supplemental signal from the corresponding vector set of signals using a distributed code generating function that produces a regenerated codeword, transmitting the supplemental signal from each participating wireless device to the destination wireless device, generating multiple supplemental signals each with a different distributed code generating function from the corresponding vector set of signals, and transmitting the multiple supplemental signals from each participating wireless device to the destination wireless device;

at the destination wireless device, receiving a copy of the original message transmitted by the source wireless device, receiving signals based on the copy of the original message from the participating wireless devices to form a vector set of signals, receiving copies of the supplemental signals transmitted by the participating wireless devices, and processing one or more of the supplemental signals, the vector set of signals, and the received copy of the original message according to a joint-decoding function to recover the original message.

5. The network of claim 1, wherein the plurality of participating wireless stations generate the supplementary message according to the distributed code generating function that employs an exclusive-or operation.

6. The method of claim 4, wherein generating comprises generating the supplemental signal according to the distributed code generating function that employs an exclusive-or operation.

7. The method of claim 4, wherein generating comprises employing a concatenated coding method for generating the regenerated codeword.

8. The method of claim 4, wherein generating comprises employing Low Density Parity-Check coding for generating the regenerated codeword.

9. The method of claim 4, wherein generating and transmitting the supplementary messages at the participating wireless devices are performed when the original message is received error-free or when a signal-to-noise ratio for the original message exceeds a predetermined threshold.

10. The network of claim 1, wherein the supplementary messages are generated and sent from the participating wireless devices when the message is received error-free or when a signal-to-noise ratio for the message exceeds a predetermined threshold.

* * * * *